United States Patent [19]
Parr

[11] 3,848,583
[45] Nov. 19, 1974

[54] SPIROMETERS
[75] Inventor: Eric W. Parr, Staines, England
[73] Assignee: Wilkinson Sword Limited, London, England
[22] Filed: Feb. 7, 1973
[21] Appl. No.: 330,190

[30] Foreign Application Priority Data
Feb. 19, 1972 Great Britain...................... 7803/72

[52] U.S. Cl. ............................................ 128/2.08
[51] Int. Cl............................................... A61b 5/08
[58] Field of Search.......................... 128/2.08, 2.07

[56] References Cited
UNITED STATES PATENTS
| | | | |
|---|---|---|---|
| 2,427,145 | 9/1947 | Koehler et al. ..................... | 128/2.08 |
| 3,533,398 | 10/1970 | Jones............................. | 128/2.08 X |
| 3,559,639 | 2/1971 | Nagus et al. ....................... | 128/2.08 |
| 3,621,835 | 11/1971 | Suzuki et al. ...................... | 128/2.08 |
| 3,722,506 | 3/1973 | McMillan, Jr. ..................... | 128/2.08 |

FOREIGN PATENTS OR APPLICATIONS
195,037    10/1967    U.S.S.R............................ 128/2.08

OTHER PUBLICATIONS
The Lancet, Vol. 1, April 5, 1958, p. 723.

Primary Examiner—Kyle L. Howell
Attorney, Agent, or Firm—Wolfe, Hubbard, Leydig, Voit & Osann, Ltd.

[57] ABSTRACT

A spirometer is disclosed comprising an expansible bellows into which the patient breathes. As the bellows expands, first and second indicators measure the increasing volume against a scale. A timer, initiated in response to the start of expansion, locks one indicator against further movement after, say, one second so that this indicator registers the forced expiratory volume for one second (FEV), while the second indicator's movement continues unaffected and measures the forced vital capacity (FVC). The instrument may be modified to measure the relaxed vital capacity also.

17 Claims, 5 Drawing Figures

PATENTED NOV 19 1974 3,848,583

SPIROMETERS

This invention relates to spirometers, such as to portable spirometers especially for early diagnosis of respiratory ailments and for monitoring the response of a patient to treatment.

When determining respiratory function, a medical practitioner may use a number of criteria for determining the condition of a patient. Two often used criteria are the forced vital capacity (FVC) of the patient's lungs and their forced expiratory volume timed for one second ($FEV_1$). The ratio of these two volumes ($FEV_1/FVC$) is also used for diagnostic purposes. Relaxed vital capacity is also a useful criterion of the patient's condition.

A spirometer is known in which an expansible chamber is provided into which the patient exhales. A scale measures the expansion of the chamber. It is necessary for the practitioner to use a stop watch or other separate timer to time the expansion in one second, and clearly such timing cannot be carried out accurately since it is difficult to read off the volume at the exact end of the one second period. If such a timer is arranged to arrest chamber expansion, then it prevents measurement of the forced vital capacity.

A spirometer is also known in which an expansible chamber into which the patient exhales drives a pen over a clock-driven chart. Such an instrument is bulky and expensive, liable to damage, and requires readings to be taken off the chart.

Besides being unsatisfactory for the measurement of forced expiratory volume, such prior spirometers are not suitable for measurement of relaxed vital capacity.

It is an object of the invention to provide an improved spirometer.

It is a further object of the invention to provide an improved spirometer which gives a direct reading of the forced expiratory volume timed for a given preset period.

It is another object of the invention to provide an improved spirometer which gives a direct reading of the forced expiratory volume timed for a given preset period, and which also gives a direct reading of forced vital capacity.

It is yet another object of the invention to provide a spirometer which gives a reading of relaxed vital capacity.

BRIEF SUMMARY OF THE INVENTION

According to the invention, there is provided a spirometer, comprising an expansible chamber for receiving air exhaled by a patient, means responsive to the receipt of the exhaled air by the chamber for indicating a measuring instant when a predetermined condition exists at a time after the initial receipt of the exhaled air, and indicating means responsive to the expansion of the chamber for indicating the volume of air received up to the said measuring instant.

According to the invention, there is also provided a spirometer, comprising a base supporting an expansible air-tight chamber having inlet means for receiving air exhaled by a patient, first indicating means coupled to the chamber to indicate continuously the amount of expansion of the chamber, and second indicating means coupled to the chamber only for a fixed duration initial period of a single exhalation to indicate only the amount of expansion of the chamber during that initial period.

According to the invention, there is further provided a spirometer, comprising a base supporting an airtight expansible chamber having inlet means for receiving air exhaled by a patient, indicating means coupled to the chamber for movement therewith to indicate the amount of expansion of the chamber, and counting means responsive to the air flow through the inlet means for counting and indicating the number of exhalation cycles producing an indicated chamber expansion.

BRIEF DESCRIPTION OF THE DRAWINGS

Portable spirometers embodying the invention will now be described, by way of example only, with reference to the accompanying drawings in which.

DESCRIPTION OF PREFERRED EMBODIMENTS

Figure 1:
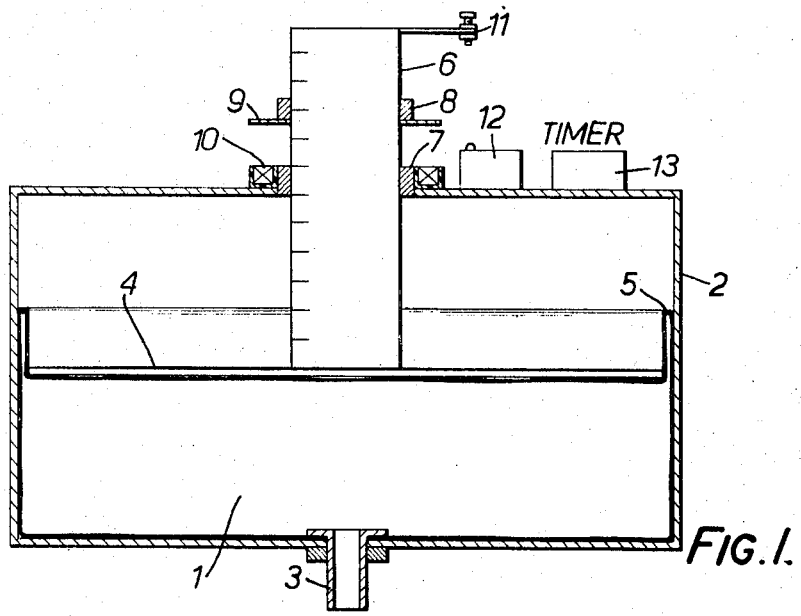
FIG. 1 illustrates diagrammatically a vertical cross-section through one of the instruments.

The spirometer of FIG. 1 consists of a flexible bag 1 within a rectangular rigid container or casing 2. The volume of the container 2 defines the total volume capable of being measured, and should preferably be of the order of or greater than 6 litres capacity. A tube 3 through the bottom of the flexible bag is sealed to the bottom of the rigid container 2 and provision is made for the connection thereto of a flexible tube (not shown) fitted with a disposable mouthpiece through which a patient can exhale into the bag.

On top of the bag 1, and within the container 2, is a rectangular plate 4 of a light, stiff material, the dimensions of the plate being such as to provide a reasonable clearance between the inner wall of the container 2 and the plate 4 and to allow the flexible bag 1 to form a rolling seal 5 therebetween.

A lightweight tube 6 is fixed to the centre of the rectangular plate 4 and the tube passes through a bearing 7 of a low friction material in the top of the container 2.

Around the light tube 6 and located above the low friction bearing 7 is a ring 8 of low friction material. When held fast in a manner to be described, the ring allows the tube 6 to slide freely. When the ring 8 is released, it moves with the tube 6. The lower surface of the ring 8 has a further ring 9 of a ferro-magnetic material attached to it which forms the armature of an electromagnet 10 which is wound around the bearing on the top of the container 2.

The top of the light tube 6 has a projection 11 which cooperates with a micro-switch 12 and is arranged to actuate the switch as soon as the tube 6 moves upwards from its lowermost position. The operation of the micro-switch 12 actuates a timer 13 which de-energises the electromagnet 10 at the end of a pre-set time period (which may be, say, a half, one or two seconds) by means of a control signal. The electrical connections between the electromagnet 10, the microswitch 12 and the timer 13 are omitted for clarity, as is the electrical power supply which may be a dry battery or via a mains lead.

In operation, the bag 1 is initially completely deflated. The person conducting the test operates a switch to actuate the electromagnet 10 and a signal lamp (not shown) may also be illuminated to indicate that the spirometer is in an operative condition. After inhaling to the maximum extent, the patient then blows into a tube (not shown) connected to the flexible bag 1. As soon as the bag 1 starts to inflate, the tube 6 rises and operates the micro-switch 12 thus starting the timing circuit. During the pre-set period, the electromagnet 10 is energised and the armature ring 9 is restrained against the bearing 7 on the top of the container 2 and the tube 6 slides through the rings 8 and 9 which remain stationary. After the preset period, the timer de-energises the electromagnet 10 and thereafter armature ring 9 moves upwardly with the tube 6. The patient continues blowing until he has emptied his lungs as far as he can, after which the tube 6 reaches a final height determined by the total volume of exhaled air. When the patient ceases blowing the tube 6 is restrained at its maximum height, for example by gravity operated cams (not shown) pressing against the tube 6.

The volume of air exhaled in the initial pre-set period and the total exhaled volume are measured from a scale inscribed on the tube 6, the volume indicated by the underside of the armature ring 9 being the volume of air which was forced into the bag 2 during the initial period (the FEV). The volume indicated on the scale by the top surface of the bearing 7 is the total volume of air forced into the bag 2 (the FVC).

In a modification, an extension piece 14 (FIG. 2) may be attached to the inlet tube at the bottom of the casing 2, intermediate this inlet tube and the flexible breathing tube not shown. The extension 14 incorporates a flap valve 16 made of resilient material biased to close off the air inlet 18. In addition, the extension 14 incorporates a microswitch 20 which is connected to the timer 13 instead of the microswitch 12. In operation, the flap valve 16 opens as soon as the patient commences blowing, and initiates the timer 13 via the microswitch 20. In this arrangement, when the patient has ceased blowing, the flap valve 16 will close and retain the total exhaled volume of air in the flexible bag thus avoiding the need for gravity operated cams. When such a flap valve is used, this may be combined with a second timer which is started by the flap valve when the patient begins to exhale and is stopped by the flap valve when the patient has ceased to blow, and thus indicates the total time required for exhalation of the maximum volume of which the patient is capable. This elapsed time provides additional diagnostic information. The flap valve 16 may provide a faster response to the passage of air than may be obtained using the microswitch 12 operated directly by the tube 6.

Figure 3:
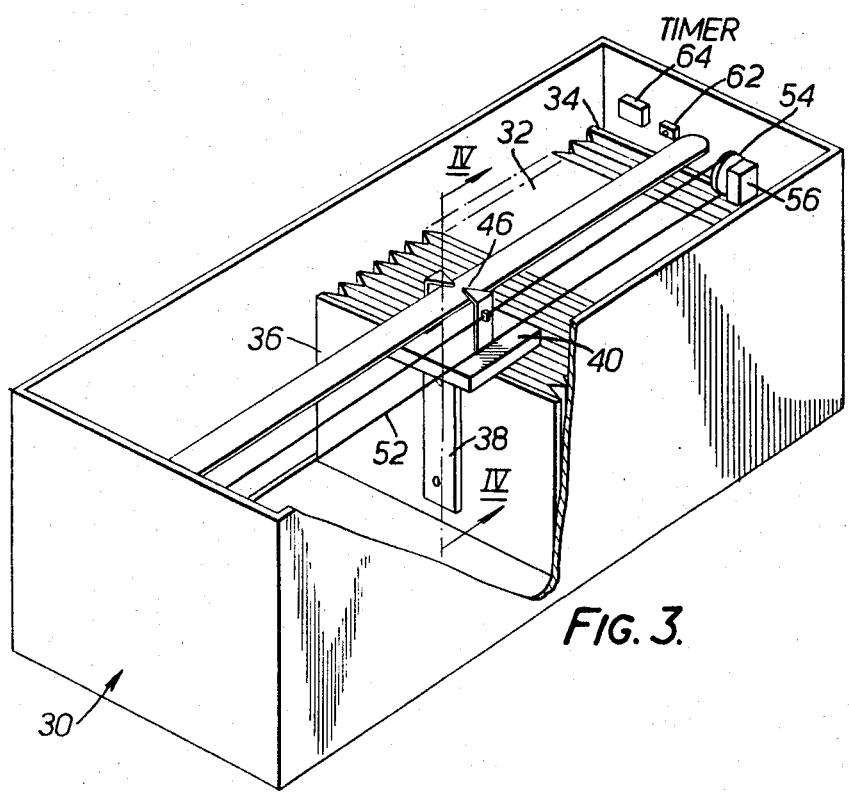
FIG. 3 is a diagrammatic perspective view of another of the instruments, with part of its casing broken away to reveal the internal mechanism.
Figure 4:
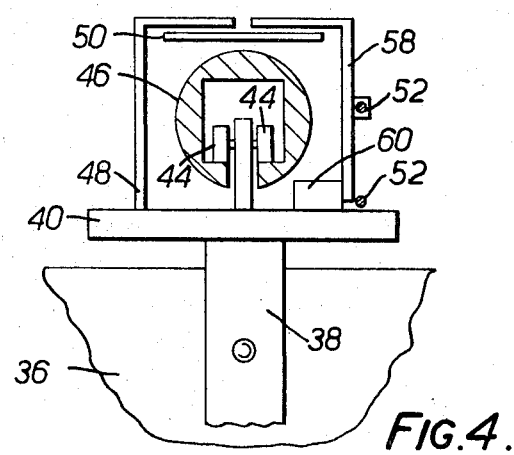
FIG. 4 is a diagrammatic cross-section on the line IV—IV of FIG. 3.

FIGS. 3 and 4 show an alternative form of the spirometer. This spirometer comprises a rectangular casing 30 whose top cover has been removed in FIG. 3 together with part of one of its side walls so as to reveal the internal mechanism. Inside the casing 30 is horizontally mounted a bellows 32 having two rigid end plates 34 and 36. End plate 34 is fixed to an end wall of the casing 30 and has an inlet tube (not visible in the Figure) which passes through it and the end wall of the casing, after the manner of the inlet tube 3 of FIG. 1, to receive a flexible breathing tube by which the patient may inflate the bellows 32. The other end plate 36 of the bellows is free and thus moves horizontally along the casing 30 as the bellows expands or contracts.

As shown most clearly in FIG. 4, a vertical arm 38 is rigidly attached to the end plate 36 and supports a trolley 40 at its top end. The trolley 40 has a vertical extension rotatably supporting two rollers 44 which engage rails formed inside a hollow support tube 46 extending between the end plates of the casing 30. The rollers 44 thus support and guide the trolley 40 as it moves horizontally along the casing 30 with expansion and contraction of the bellows 32.

The trolley 40 rigidly supports an FVC indicator 48 which extends up and over a scale plate 50 which extends between the two end plates of the casing 30 above the tube 46 and is omitted from FIG. 3 for clarity.

As shown in FIG. 3, an endless cord 52 runs between the two end plates of the casing 30 over a pulley 54 on one end plate and a second pulley (not visible in the Figure) on the other end plate. Pulley 54 is associated with an electromagnetically operative brake unit 56 which, when electrically activated, brakes the pulley 54 against rotation.

The upper run of the cord 52 is firmly attached to an FEV indicator 58 (FIG. 4) which passes up and over the scale plate 50. The FEV indicator 58 is made of ferro-magnetic material, or has an insert of this material, and, when the cord 52 is positioned so that the indicator 58 is aligned across the scale 50 with the indicator 48, the magnet 60 holds this alignment.

A microswitch 62 is mounted on one end plate of the casing 30 and positioned for operation by the trolley 40. The microswitch 62 is connected to a timer 64 which, at the end of a preset time interval (which again may be, say, a half, one or two seconds), produces a control signal which actuates the brake unit 56. The electrical connections between the brake unit 56, the microswitch 62 and the timer 64 are omitted for clarity, as is the power supply or power connections.

In operation, the bellows 32 is manually set in the closed or contracted position with one end of the trolley 40 contacting the microswitch 62. The patient is then instructed to blow into the flexible tube (not shown) and this starts to expand the bellows 32. Immediately the bellows starts to expand, the trolley 40 moves away from and operates the microswitch 62. This initiates the timer 64. With continued expansion of the bellows, the aligned pointers 48 and 58 move along the scale, the pointer 58 being pulled along by the magnet 60.

At the end of the preset time interval of the timer 64, the timer actuates the brake unit 56 which locks the pulley 54 against further rotation. The FEV indicator 58 is thus held stationary but the FVC indicator 48 continues to move with the trolley 40 and the expanding bellows.

The patient continues to exhale until he can force no more air from his lungs at which point further expansion of the bellows ceases. The indication of the scale 50 of the FVC indicator 48 thus indicates the forced vital capacity of the patient, while the indication of the FEV indicator 58 on the scale 50 is the forced expiratory volume for the period of the timer.

The top cover of the casing 30 would have a slot or window to permit viewing of the scale 50 and the pointers 48 and 58.

The spirometer of FIGS. 3 and 4 is advantageous over the arrangement of FIG. 1 in that the instrument of FIGS. 3 and 4, in which the bellows expands horizontally, imposes no gravitational back pressure.

Figure 2:
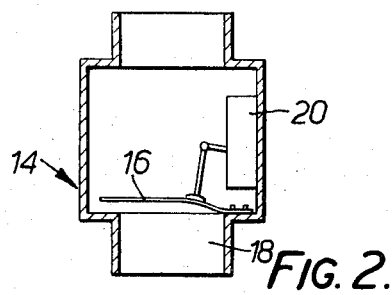
FIG. 2 is a cross-section of an extension piece for use with the instrument of FIG. 1.

The spirometer of FIGS. 3 and 4 may be modified by using an extension similar to that shown in FIG. 2 for initiating the timer 64 instead of the microswitch 62.

Figure 5:
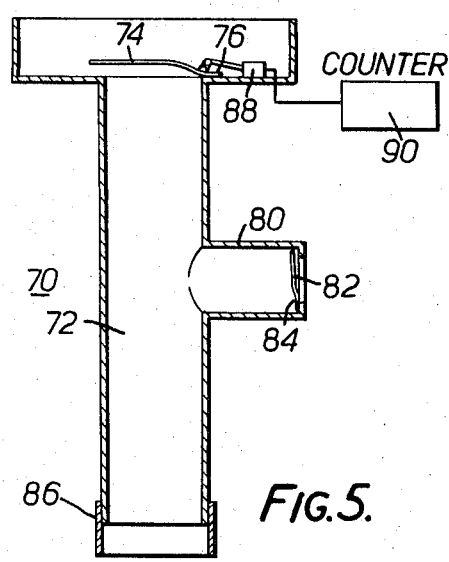
FIG. 5 is a diagrammatic view of a valve system for use with either the instrument of FIGS. 1 and 2 or that of FIGS. 3 and 4.

FIG. 5 shows an extension piece 70 which may be used with either of the spirometers illustrated to enable them to be used to measure relaxed vital capacity (VC). Relaxed vital capacity is the capacity of the patient's lungs when breathing in a relaxed and normal manner.

As shown, the extension 70 comprises a tubular portion 72 for attachment to the inlet tube of the bellows and this incorporates a first flap valve 74 which is pivoted at a pivot point 76 and, when closed, bears against the outside of the end of the tube 72. The tube 72 has a side extension 80 at whose open end a second flap valve 82 is pivoted about an axis 84. When closed, the flap valve 82 bears against the inside of an inwardly projecting rim around the extension 80.

The tube 72 terminates in a mouthpiece 86, and, in use, the patient breathes in a completely relaxed fashion into this mouthpiece. Each exhalation of air turns the flap valve 74 in a clockwise direction about its pivot axis 76, thus opening the end of the tube 72 and allowing the air to enter the bellows. Simultaneously, the exhaled air holds the flap valve 82 closed to shut off the tube 80. When the patient has completed his relaxed exhalation, he then inhales, again in a relaxed fashion, and this causes the flap valve 74 to close and the flap valve 82 to open to enable him to inhale. He then exhales again and the cycle repeats.

After a measured number of cycles have taken place, the total volume exhaled into the bellows is measured by means of the scale (using the reading established by the top of the bearing 7 in the arrangement of FIG. 1 or the reading established by the FVC indicator 48 in the case of the instrument of FIGS. 3 and 4). This reading, divided by the number of cycles, gives the patient's relaxed vital capacity. In order to measure the total number of breathing cycles, the flap valve 74 is arranged to operate a simple electrical switch 88 to control a counter 90 and thus to indicate the number of breathing cycles made by the patient. The valve 82 could instead be used to operate the switch 88. It may be desirable to fix a manually operable exhaust valve in the tube 72 between the valves 74 and 82 to enable relaxed breathing to be established by the patient before the test is started. Such an exhaust valve could be arranged to disable the counter when opened. Means may be provided to open the valve 74 when the test is completed to exhaust the bellows.

When the spirometer is used for measuring relaxed vital capacity, then the circuitry for controlling the FEV indicating means can be disabled.

Instead of the flap valves 74 and 82, other types of non-return valves which introduce negligible back pressure may be used.

Instead of the bellows shown in the spirometers described, other forms of expansible chamber producing negligible back pressure may be used.

In another form, a spirometer embodying the invention has a maximum air volume which is less than the volume of the patient's lungs. Thus, for example, the spirometer may comprise a flexible diaphragm dividing a horizontal cylinder into right and left halves, the diaphragm being coupled to an external indicator via a ratchet mechanism to indicate an incremental volume each time the diaphragm is moved by a predetermined distance to the left (say). The external indicator could be a rotary scale rotatable relative to a fixed pointer. Also provided would be a slide valve arrangement or similar arrangement controlling the connection of two ports (respectively communicating with the right and left cylinder halves) to an inlet port (for receipt of the patient's breath) and an exhaust port. In one extreme position, the slide valve arrangement would connect the left hand cylinder port to the air inlet port for receipt of the patient's breath and the right hand cylinder port to exhaust, and in its other extreme position the slide valve arrangement would connect the right hand cylinder port to the air inlet port for receipt of the patient's breath and the left hand cylinder port to exhaust. The slide valve arrangement would be connected to be moved between its two extreme positions by or under control of the diaphragm movement so as to reverse the port connections each time the diaphragm reached its limit of movement. As before, means responsive to the initial receipt of the patient's breath would be provided (possibly operated by a flap valve in the air inlet port): this would operate a timer which, after the preset time period (a half, one or two seconds, say) would release a hitherto fixed, second, pointer which would thereafter rotate with the scale to indicate the FEV.

Instead or in addition, the modified spirometer just described could be associated with the extension illustrated in FIG. 5 for measuring the relaxed vital capacity.

The spirometers illustrated could be modified to use pistons slidable in cylinders to provide the expansible chambers.

What is claimed is:

1. A self-contained hand-portable spirometer, comprising
   a hand-portable container having an inlet for receiving air exhaled by a patient,
   an expansible chamber in the container and having an air inlet connected to the said inlet of the container for receiving the air exhaled by the patient, the expansible chamber being defined by wall means of substantially air-tight solid-phase material,
   indicating means attached to the container,
   control means releasably rendering the indicating means responsive to the chamber expansion for indicating the volume of the said air received,
   timing means attached to the container,
   means responsive to the initial receipt of the exhaled air by the chamber for initiating the timing means to produce a timing signal for indicating a measuring instant at a predetermined time after the initial receipt of the exhaled air, and
   means responsive to the said timing signal for actuating the control means to render the indicating means unresponsive to the expansion of the chamber and to maintain the indication of the indicating means at the said predetermined instant.

2. A spirometer according to claim 1, in which the said chamber is mounted in the container to expand in a horizontal direction when the container is in its normal attitude, the indicating means comprises an indicator member, a scale member mounted to be in register with the indicator member, and means fixedly coupling one of the said members to the container; and the said control means comprises releasable coupling means releasably coupling the other of the said members to the chamber to move therewith relative to the said one of the members as the chamber expands, and means responsive to the said timing signal to actuate the said releasable coupling means to release the other of the said members from the chamber at the predetermined instant.

3. A spirometer according to claim 2, in which the said one member is the scale member, and including a further indicator member and means fixedly coupling the further indicator member to the chamber for causing uninterruptable relative movement between this indicator member and the scale member as the chamber expands.

4. A spirometer according to claim 1, in which the indicating means comprises an indicator member, a scale member mounted to be in register with the indicator member, means fixedly coupling one of the said members to the chamber to move therewith as the chamber expands, and means providing a force acting between the two said members and tending to cause them to move together as the chamber expands, and the said control means comprises releasable locking means releasably locking the other of the said members to the container against the action of the said force, and means responsive to the said timing signal to release the locking means whereby to allow the two said members to thereafter move together under the action of the said force.

5. A spirometer according to claim 4, in which the said one member is the scale member and including a further indicator member in register with the scale member and means fixedly coupling the further indicator member to the container for causing uninterruptable movement of this indicator member and the scale member as the chamber expands.

6. A spirometer according to claim 1, including air flow responsive means mounted in the said inlet to the container and operative to produce a count signal in response to each incipient reversal of air flow in the said inlet, and counting means for counting the said count signals to indicate the number of separate exhalations of air into the chamber.

7. A spirometer according to claim 1, in which the said expansible chamber is defined by an expansible bellows.

8. A self-contained hand-portable spirometer, comprising a hollow hand-held portable container having an air inlet for receiving air exhaled by a patient, an expansible substantially air-tight chamber supported in the container and having an air inlet coupled to the said air inlet of the container for receiving air exhaled by the patient, the air-tight chamber being defined by wall means made of solid-phase substantially air-tight material at least part of which is flexible and the remainder of which is non-flexible, first and second indicating means mounted to the container for indicating the amount of expansion of the chamber, means fixedly coupling the first indicating means to the chamber to indicate continuously the amount of expansion thereof, timing means attached to the container, means on the container and responsive to initial receipt of air by the chamber to actuate the timing means to produce a control signal at the end of a fixed duration initial period of a single exhalation, and control means responsive to the said control signal and mounted in the container to releasably render the second indicating means responsive to the chamber expansion only until the said control signal occurs, whereby the second indicating means indicates only the amount of expansion of the chamber during the said inital period.

9. A spirometer according to claim 8, including a scale member on the container, and in which the first indicating means comprises a first indicator member in register with the scale member, one of the said members being fixed to the chamber to move therewith and the other said member being fixed to the container so that the two said members undergo continuous relative movement in register with each other as the chamber expands, and the second indicating means comprises a second indicator member in register with the scale member and releasably coupled by the said control means to the first indicator member so that the second indicator member and the said scale member undergo relative movement in register with each other only for the length of the said initial period.

10. A spirometer according to claim 9, in which the said scale member is fixed to the chamber for continuous movement therewith as the chamber expands, the first indicator member is fixedly attached to the container, and the second indicator member is frictionally coupled to the scale member; and the said control means comprises clamping means for clamping the second indicator member to the container during the said initial period so that the scale member moves relative to the second indicator member until the end of the initial period and thereafter moves with the said scale member.

11. A spirometer according to claim 9, in which:

the said chamber is mounted in the container to expand in a horizontal direction when the container is in its normal attitude, the said scale member is fixedly attached to the container, the first indicator member is fixedly coupled to chamber to move along the scale member as the chamber expands, and the second indicator member is mounted for movement along the scale member; and the control means comprises clamping means for releasably clamping the second indicator member to the chamber to move therewith for the duration of the said initial period, and locking means operative in response to the said control signal to lock the second indicator member relative to the base against further movement along the scale member.

12. Apparatus according to claim 8, in which the means responsive to the initial entry of the exhaled air comprises a microswitch mounted on the said container to be actuated in response to the initial expansion of the chamber.

13. Apparatus according to claim 8, in which the means responsive to the initial entry of the exhaled air comprises means in one said inlet to respond to the air flow therethrough.

14. A spirometer according to claim 8, in which the container air inlet includes
   a mouthpiece for the patient,
   a tube coupling the mouthpiece to the expansible chamber,
   a first non-return valve in the said tube, and
   a second non-return valve coupling the said tube to atmosphere,
   the first non-return valve being arranged to allow entry of exhaled air into the chamber but blocking the return of such air, and
   the second non-return valve blocking the exit of the exhaled air to atmosphere but allowing the patient to inhale air from the atmosphere through the said tube and mouthpiece.

15. A spirometer, comprising
   a base,
   an expansible air-tight chamber supported on the base and having inlet means for receiving air exhaled by a patient,
   a scale mean fixed to the chamber for continuous movement therewith as the chamber expands,
   a first indicator means in register with the scale means and fixedly attached to the base whereby it and the scale means continuously indicate the amount of expansion of the chamber,
   means mounted on the base and responsive to initial receipt of the exhaled air to produce a control signal at the end of the fixed duration initial period of a single exhalation,
   a second indicator means frictionally coupled to the scale means,
   an electrically energisable electromagnet means mounted on the base for magnetically locking the second indicator means to the base during the said initial period so that the scale means moves relative to the second indicator means to indicate the amount of expansion of the chamber during the said initial period, and
   means mounted on the base and responsive to the said control signal for de-energising the electromagnet at the end of the initial period so that the second indicator means thereafter moves with the said scale.

16. A spirometer, comprising
   a base,
   an expansible air-tight chamber supported on the base and having inlet means for receiving air exhaled by a patient,
   a scale means fixedly attached to the base,
   a first indicator means fixedly coupled to the chamber and mounted in register with the scale means to move along the scale means as the chamber expands so as to indicate continuously the amount of expansion of the chamber,
   means mounted on the base and responsive to the initial receipt of the exhaled air to produce a control signal at the end of a fixed duration initial period of a single exhalation,
   a second indicator means mounted on the base for movement in register with the said scale means,
   a magnet means mounted for magnetically clamping the second indicator means to the chamber so that the chamber draws the second indicator means along its path of movement to indicate the expansion of the chamber during the said initial period, and
   locking means mounted on the base and operative in response to the said control signal to lock the second indicator means to the base against further movement along the scale.

17. A spirometer according to claim 16, including endless cord means having one of its runs extending alongside the scale means and fixed to the second indicator means, and in which the locking means comprises braking means for braking the cord against further movement.

* * * * *